Figure 1:
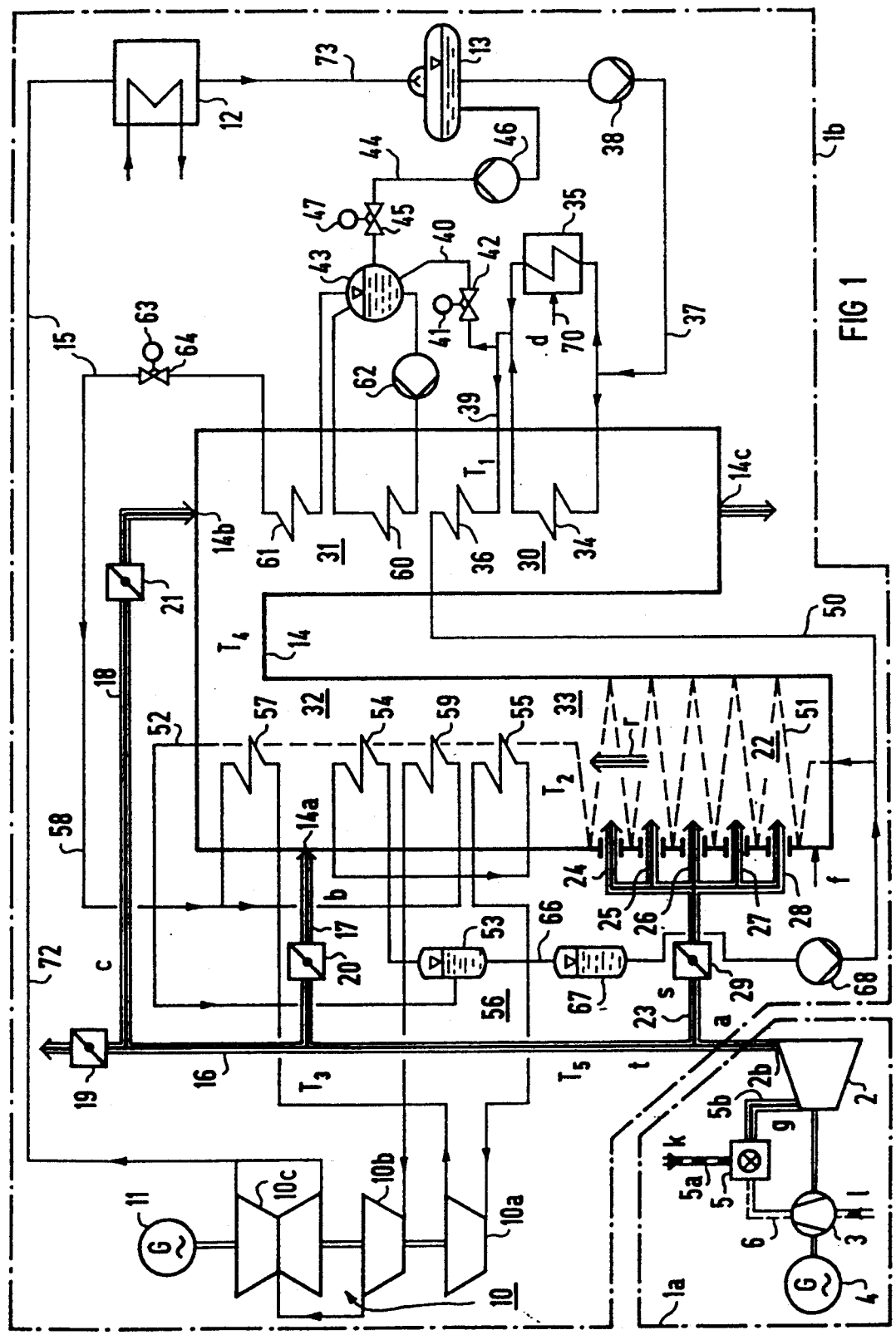

United States Patent [19]
Brückner et al.

[11] Patent Number: 5,365,730
[45] Date of Patent: Nov. 22, 1994

[54] COMBINED GAS AND STEAM TURBINE SYSTEM

[75] Inventors: Hermann Brückner, Uttenreuth; Erich Schmid, Marloffstein, both of Germany

[73] Assignee: Siemens Aktiengesellschaft, Munich, Germany

[21] Appl. No.: 34,679

[22] Filed: Mar. 19, 1993

[30] Foreign Application Priority Data

Sep. 21, 1990 [DE] Germany .................... 4029991

[51] Int. Cl.$^5$ .................................... F02C 6/00
[52] U.S. Cl. ..................... 60/39.182; 122/7 B; 122/7 R; 60/39.15; 60/39.181
[58] Field of Search .............. 60/39.07, 39.182, 39.15, 60/39.181; 122/7 B, 7 R

[56] References Cited

U.S. PATENT DOCUMENTS

| | | | |
|---|---|---|---|
| 3,150,487 | 9/1964 | Mangan et al. | 60/39.182 |
| 3,667,217 | 6/1972 | Vidal et al. | 60/39.182 |
| 3,675,426 | 7/1972 | Vidal et al. | 60/39.182 |
| 4,207,842 | 6/1980 | Kehlhofer | 60/39.182 |
| 4,261,166 | 4/1981 | Mayrhofer | 60/39.182 |
| 4,353,206 | 10/1982 | Lee | 122/7 B |
| 4,697,415 | 10/1987 | Schiffers | 60/39.182 |
| 4,723,407 | 2/1988 | Goebel et al. | 60/39.182 |
| 4,799,461 | 1/1989 | Shigenaka et al. | 122/7 R |
| 4,854,121 | 8/1989 | Arii et al. | 60/39.182 |
| 5,044,163 | 9/1991 | Bruckner et al. | 60/39.182 |
| 5,212,941 | 5/1993 | Croonenbrock et al. | 60/39.182 |
| 5,251,432 | 10/1993 | Bruckner et al. | 60/39.182 |
| 5,255,507 | 10/1993 | Gounder | 60/39.182 |
| 5,269,130 | 12/1993 | Finckh et al. | 60/39.182 |

FOREIGN PATENT DOCUMENTS

| | | | |
|---|---|---|---|
| 0062932 | 10/1982 | European Pat. Off. | 60/39.182 |
| 1134503 | 4/1957 | France . | |
| 2030500 | 11/1970 | France . | |
| 2107449 | 5/1972 | France . | |
| 2161549 | 7/1972 | Germany . | |
| 3127733 | 12/1982 | Germany | 60/39.182 |
| 55-69713 | 5/1980 | Japan | 60/39.182 |
| 55-112812 | 9/1980 | Japan | 60/39.182 |
| 58-190504 | 11/1983 | Japan | 60/39.182 |
| 3-908 | 1/1991 | Japan | 60/39.182 |
| 621186 | 1/1981 | Switzerland . | |
| 0503029 | 2/1976 | U.S.S.R. | 60/39.182 |

*Primary Examiner*—Richard A. Bertsch
*Assistant Examiner*—Howard R. Richman
*Attorney, Agent, or Firm*—Herbert L. Lerner; Laurence A. Greenberg

[57] ABSTRACT

A combined gas and steam turbine system includes a steam turbine having a water/steam loop and a high-pressure stage in the water/steam loop. The high-pressure stage has a preheater and a high-pressure heater connected downstream of the preheater. A gas turbine has an exhaust gas side. A steam generator is connected downstream of the exhaust gas side of the gas turbine. The steam generator includes a firing system producing flue gases flowing in a given direction, the preheater, the high-pressure heater, an intermediate superheater connected downstream of the high-pressure stage, and a medium-pressure heater connected parallel to the high-pressure stage. The medium-pressure heater is disposed in the steam generator between the high-pressure heater and the preheater, as seen in the given flow direction of the flue gases.

12 Claims, 2 Drawing Sheets

COMBINED GAS AND STEAM TURBINE SYSTEM

CROSS-REFERENCE TO RELATED APPLICATION

This application is a continuation of International Application Serial No. PCT/DE91/00096, filed Feb. 6, 1991.

SPECIFICATION

The invention relates to a combined gas and steam turbine system including a steam generator connected downstream of the exhaust gas side of a gas turbine, the steam generator having a firing system and a preheater incorporated into a water/steam circuit of a steam turbine and a high-pressure heater of a high-pressure stage of the steam turbine connected downstream of the preheater, and an intermediate superheater connected downstream of the high-pressure stage.

In such a combined gas and steam turbine system with a steam generator that includes a firing system that is known, for example, from Published French Application No. 2,030,500, the exhaust gases of the gas turbine are typically used as combustion air for the firing system. The performance of the steam turbine and gas turbine, and of the steam generator, are dependent on one another, so that when such a system is constructed they must be adapted to one another.

The adaptation is typically performed in such way that during rated load operation, the oxygen requirement of the furnace system can be met by the exhaust gases from the gas turbine. However, gas turbines having only slightly differing capacities, such as 50 MW, 150 MW or 200 MW, are also produced and sold, so that it is extremely difficult to adapt them to the capacity of the steam turbine and that of the steam generator.

For a given system size, the gas turbine therefore furnishes either an overly large or overly small quantity of exhaust gas, in comparison with the required quantity of exhaust gas needed for the firing system in full-load operation. If the exhaust gas quantity is too small, then only a low system efficiency can be attained in the full-load range, although it improves in the partial-load range. In that case, the missing oxygen for the firing system is typically furnished by an additional fresh-air blower.

Conversely, if the quantity of exhaust gas is too high in the partial load range, then the gas turbine capacity must be lowered at a relatively early time. In modern gas turbines, that is typically achieved by adjusting the blades of the gas turbine to reduce the air throughput through the gas turbine. However, with increasing reduction in the gas turbine capacity, the efficiency of the system in partial-load operation decreases. In other words, the total efficiency sought is only a limited one in either case.

It is accordingly an object of the invention to provide a combined gas and steam turbine system, which overcomes the hereinafore-mentioned disadvantages of the heretofore-known devices of this general type and which achieves the highest possible total efficiency in a combined gas and steam turbine system, in all operating states, including both the full-load and partial-load ranges.

With the foregoing and other objects in view there is provided, in accordance with the invention, a combined gas and steam turbine system, comprising a steam turbine having a water/steam loop and a high-pressure stage in the water/steam loop, the high-pressure stage having a preheater and a high-pressure heater connected downstream of the preheater; a gas turbine having an exhaust gas side; and a steam generator connected downstream of the exhaust gas side of the gas turbine, the steam generator including a firing system producing flue gases flowing in a given direction, the preheater, the high-pressure heater, an intermediate superheater connected downstream of the high-pressure stage, and a medium-pressure heater connected parallel to the high-pressure stage, the medium-pressure heater being disposed locally in the steam generator between the high-pressure heater and the preheater, as seen in the given flow direction of the flue gases.

As a result, when there is a large quantity of exhaust gas from the gas turbine, high efficiency is achieved even in the partial-load range, so that high total efficiency of the system is attained. The high-pressure stage of the steam turbine is followed by an intermediate superheater in order also to recover heat from the steam generator for a medium-pressure part of the steam turbine.

In accordance with another feature of the invention, the medium-pressure heater is connected parallel to a series circuit including the preheater, the high-pressure heater and a high-pressure portion of the steam turbine.

In accordance with a further feature of the invention, there is provided a pump disposed in an inflow line to the medium-pressure heater. This is done in order to build up and maintain the pressure required in the medium-pressure heater.

In accordance with an added feature of the invention, at least part of the exhaust gases from the gas turbine are introduced directly into the steam generator, bypassing the firing system. This is done in order to create a steam process with high steam pressure and a high temperature.

The aforementioned part of the exhaust gases may be split into two partial streams. It should be possible to introduce a first partial stream into the steam generator locally downstream of the intermediate superheater, and a second partial stream locally upstream of the intermediate superheater, as viewed in the flue gas flow direction.

Therefore, in accordance with an additional feature of the invention, there are provided means for directing a partial stream of exhaust gases from the gas turbine into the steam generator downstream of the intermediate superheater, as seen in the given flow direction of the flue gases. In accordance with yet another feature of the invention, there are provided means for directing a partial stream of exhaust gases from the gas turbine into the steam generator upstream of the intermediate superheater, as seen in the given flow direction of the flue gases.

In accordance with yet a further feature of the invention, the intermediate superheater includes a preheater stage and a final superheater stage downstream thereof, so that the second partial stream can be introduced between the preheater stage and the final superheater stage.

As a result, without lessening the capacity of the gas turbine, the heat contained in the exhaust gases can also be exploited in the partial-load range of the system and utilized for the steam process, so that high efficiency of the steam process can be attained. If the exhaust gases from the gas turbine that are excess in the partial-load range are split under open or closed-loop control to make the two partial streams, then moreover one additional cooler for the intermediate superheater can be dispensed with. This has an especially favorable effect on the total efficiency of the system.

In accordance with yet an added feature of the invention, the preheater includes a parallel circuit having a first heat exchanger disposed inside the steam generator and a second heat exchanger disposed outside the steam generator, and an economizer disposed downstream of the parallel circuit, inside the steam generator.

In accordance with yet an additional feature of the invention, the medium-pressure heater is connected downstream of the parallel circuit including the first and second heat exchangers.

In accordance with again another feature of the invention, the medium-pressure heater follows the preheater stage of the intermediate superheater and precedes the final superheater stage of the intermediate superheater. This makes for a particular advantageous utilization of the heat in the steam generator.

In accordance with a concomitant feature of the invention, the medium-pressure heater and the high-pressure heater each include one preheater stage and one superheater stage downstream of the preheater stage.

The advantages attained with the invention are in particular that an additional heat sink for the hot flue gases is created by using a medium-pressure heater locally upstream of the preheater, as viewed in the flow direction of the flue gases in the steam generator. As a result, on one hand evaporation from the heating surfaces of the preheater, in particular the economizer heating surfaces, is reliably prevented while the quantity of water introduced into the water/steam circuit in the partial-load range is reduced. On the other hand by introducing a part of the exhaust gases from the gas turbine into the primary side of the steam generator, the quantity of heat introduced with the exhaust gas into the steam generator is additionally used for steam production, so that the efficiency of the steam process and therefore the total efficiency of the system are improved, both in the partial-load range and the full-load range. Such a system can advantageously be operated with a gas turbine of the conventional type available on the market, having an exhaust gas quantity which is greater than the quantity required at rated load operation.

Other features which are considered as characteristic for the invention are set forth in the appended claims.

Although the invention is illustrated and described herein as embodied in a combined gas and steam turbine system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
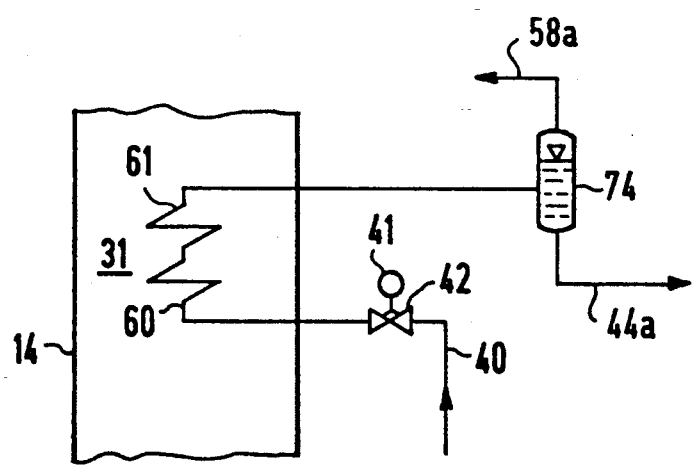

FIG. 1 is a schematic diagram of a configuration and a circuit of a medium-pressure heater according to the invention in a steam generator of a combined gas and steam turbine system; and FIG. 2 is a diagram of a variant of the medium-pressure heater in the steam generator of FIG. 1.

Referring now to the figures of the drawing in detail and first, particularly, to FIG. 1 thereof, there is seen a gas and steam turbine system which includes a gas turbine system 1a and a steam turbine system 1b. The gas turbine system 1a includes a gas turbine 2 with an air compressor 3 connected thereto, a generator 4 and a combustion chamber 5 being connected upstream of the gas turbine 2 and being connected to a first air line 6 of the air compressor 3.

The steam turbine system 1b includes a steam turbine 10 with a generator 11 coupled thereto, a condenser 12 connected downstream of the steam turbine 10, a feedwater tank 13 connected downstream of the condenser 12 and a steam generator 14. A water/steam circuit of the steam turbine 10 is generally identified by reference numeral 15.

An output 2b of the gas turbine 2 is connected to an exhaust gas line 16. On the exhaust gas side, a firing system or furnace 22, which in the exemplary embodiment is disposed inside the steam generator 14, is connected downstream of the gas turbine 2. To that end, a branch 23 is connected to the exhaust gas line 16 and discharges into the firing system 22 through delivery lines 24 to 28.

A valve 29 is incorporated into the branch 23. By way of example, as is suggested by the delivery lines 24 to 28, the firing system 22 may include a total of twenty non-illustrated burners, in five levels one above the other, wherein four burners are assigned to each level.

In order to deliver a portion t of exhaust gases a from the gas turbine 2 to the steam generator 14, a first partial stream line 17 is connected to an inlet 14a of the steam generator 14, and a second partial stream line 18 is connected to an inlet 14b of the steam generator. Butterfly valves 19, 20 and 21, which may be throttle valves or other control devices, are respectively incorporated into the exhaust gas line 16 and into the partial stream lines 17 and 18. The butterfly valves 19, 20 and 21 may be actuated by non-illustrated motors.

The steam generator 14 includes a preheater 30, a medium-pressure heater 31, an intermediate superheater 32 and a high-pressure heater 33.

The preheater 30 includes a first heat exchanger 34 disposed inside the steam generator 14; a second heat exchanger 35 outside the steam generator 14 being connected parallel to the first heat exchanger 34; and an economizer 36. The heat exchangers 34 and 35 are connected to the feedwater tank 13 through a common inflow line 37 in which a pump 38 is located. The heat exchangers 34 and 35 are connected to the economizer 36 through a common outflow line 39. The heat exchangers 34 and 35 are also connected to a water/steam tank 43 through a branch 40, into which a valve 42 actuatable by a motor 41 is incorporated.

The water/steam tank 43 may also communicate directly with the feedwater tank 13 through a line 44, in which a valve 45 and a pump 46 are provided. The valve 45 is actuatable by a motor 47.

The inlet side of the high-pressure heater 33 is connected to the economizer 36 through a line 50. The high-pressure heater 33 includes a tube assembly 51 having a jacket side disposed in the steam generator 14 in the region of the firing system 22 and an outlet side connected through a line 52 to a separating vessel 53. The high-pressure heater 33 also includes a preheater stage 54 and a superheater stage 55 connected downstream thereof. The preheater stage 54 is connected on the inlet side to the separating vessel 53. On the outlet side, the superheater stage 55 is connected to a high-pressure part 10a of the steam turbine 10. The series circuit including the preheater 30, the high-pressure heater 33, and the high-pressure part 10a of the steam turbine 10 forms a high-pressure stage 56.

The intermediate superheater 32 includes a preheater stage 57 which is connected on the outlet side to a line 58, and a final superheater stage 59 which is connected on the inlet side to the line 58.

The medium-pressure heater 31 includes an evaporator or preheater stage 60 and a superheater stage 61. The inlet side of the preheater stage 60 is connected to the water/steam tank 43 through a recirculating pump 62. The water/steam tank 43 is connected on the steam side to both the preheater stage 60 and the superheater stage 61. The superheater stage 61 is connected on the outlet side through the line 58 to the superheater 32. A valve 64 that actuated by a motor 63 is incorporated into the line 58. The medium-pressure heater 31 is thus connected parallel to the series circuit including both the economizer 36 and the high-pressure heater 33 and the high-pressure part 10a of the steam turbine. The pressure required in the medium-pressure heater 31 is adjusted through the valve 42. However, the medium-pressure heater may also be connected directly to the feedwater tank 13 through the line 44. It then remains connected parallel to the high-pressure stage 56. In this version, the pump 46 puts the feedwater at the necessary pressure.

The high-pressure part 10a of the steam turbine assembly 10 is connected on the outlet side to the preheater stage 57 of the intermediate superheater 32. The final superheater stage 59 of the intermediate superheater 32 is connected on the outlet side to a medium-pressure part 10b of the steam turbine assembly 10. The medium-pressure part 10b is connected to a low-pressure part 10c of the steam turbine assembly 10. The low-pressure part 10c is connected on the outlet side to the condenser 12.

When the combined gas and steam turbine system is in operation, the combustion chamber 5 is supplied through a delivery line 5a with coal k or some other fuel, such as oil or gas, in a manner that is not shown in detail. The coal k is combusted in the combustion chamber 5 with compressed fresh air 1 from the air compressor 3. Hot flue gas g produced in the combustion is carried into the gas turbine 2 through a flue gas line 5b. It expands there and in so doing drives the gas turbine 2, which in turn drives the air compressor 3 and the generator 4. The hot exhaust gases a emerging from the gas turbine 2 are carried through the branch 23 as combustion air s and through the delivery lines 24 to 28 into the firing system 22 of the steam generator 14. The portion t of the hot exhaust gases a not required for the combustion in the firing system 22 is introduced into the steam generator 14 through the branches 17 and 18. A first partial stream b is preferentially carried between the preheater stage 57 and the final superheater stage 59 of the intermediate superheater 32. A further partial stream c is carried into the steam generator 14 through the branch 18 locally downstream of the intermediate superheater 32, in terms of the flow direction of flue gases r produced in the firing system 22. The quantitative ratio between the two partial streams b and c can be adjusted through the respective butterfly valves 20 and 21. Any portion t of the hot exhaust gases a that may not be required for the steam production is carried away through the butterfly valve 19 in the direction of a non-illustrated stack.

The feedwater from the feedwater tank 13 is pumped by the pump 38 into the preheater 30 and flows through the heat exchangers 34 and 35 as well as the economizer 36. In the preheater stage 30, the feedwater is heated to a temperature T1, which is approximately 330° C. A portion of the feedwater, which is adjustable with the valve 42, flows through the branch 40 into the water/steam tank 43. In order to heat the feedwater in the heat exchanger 35, hot steam d is delivered to the heat exchanger from the steam turbine 10 through a line 70, in a manner which is not shown in detail. Alternatively, feedwater may be pumped directly into the water/steam tank 43 through the line 44, bypassing the preheater 30.

The feedwater preheated in the preheater 30 flows through the line 50 into the high-pressure heater 33. In so doing, it flows through the tube assembly 51, which is heated by the hot flue gas r from the firing system 22, and in the process it is heated, evaporated, and superheated. A temperature T2 of the flue gas r from the firing system 22 is approximately 1100° C. The superheated steam, which may also still include wet steam, then flows through the line 52 into the separating vessel 53. There, the steam is separated from the water. The steam flows through the preheater stage 54 and the superheater stage 55 of the high-pressure heater 33 into the high-pressure part 10a of the steam turbine 10. The water is fed into the line 50 through a line 66, in which a collecting vessel 67 and a pump 68 are located. The exhaust steam of the high-pressure part 10a flows at a temperature T3, which lies at approximately 400° C., through the preheater stage 57 and the final superheater stage 59 of the intermediate superheater 32. It is reheated there and then flows into the medium-pressure part 10b of the steam turbine 10. The exhaust steam from the medium-pressure part 10b flows into the low-pressure part 10c of the steam turbine 10 and from there through a line 72 into the condenser 12, where it is condensed. The condensate flows out of the condenser 12 through a line 73 and the feedwater tank 13.

The temperature of the hot flue gases r from the firing system 22 is still approximately 400° C. in the region of the intermediate superheater 32 and the medium-pressure heater 31. By admixing the hot exhaust gas a from the gas turbine 2, having the temperature T5 which is approximately 500° C., through the partial stream lines 17 and 18, the mixed temperature T4 is established inside the steam generator 14 in the region of the intermediate superheater 32 and the medium-pressure heater 31. The mix temperature T4 is approximately 450° C. The exhaust gas a of the two partial streams b and c, as well as the flue gas r, leave the steam generator 14 through an outlet 14c in the direction of the non-illustrated stack.

The feedwater in the water/steam tank 43 is pumped by the pump 62 through the preheater stage 60 of the medium-pressure heater 31, and from there back into the water/steam tank 43. In the process, the feedwater is heated and reaches the superheater stage 61 of the medium-pressure heater 31 in the form of steam. The steam, together with the exhaust steam from the high-pressure part 10a of the steam turbine 10 which is heated in the preheater stage 57 of the intermediate superheater 32, flows through the line 58 into the final superheater stage 59 of the intermediate superheater 32, and from there into the medium-pressure part 10b of the steam turbine 10. The quantity of steam from the medium-pressure heater 31 flowing through the line 58 can be adjusted with the valve 64.

In full-load operation, as a result of the additionally provided medium-pressure heater 31 according to the invention and as a result of the quantity of heat additionally introduced into the steam generator 34 with the partial streams b and c, an additional quantity of steam is introduced into the medium-pressure part 10b of the steam turbine assembly 10. This increases the efficiency of the steam generator 14.

In partial-load operation, the quantity of fuel f delivered to the firing system 22 per unit of time is typically reduced. Accordingly, the quantity of combustion air s for the firing system 22 is reduced as well, so that a correspondingly larger partial quantity of exhaust gas a can be introduced into the steam generator 14 through the partial stream lines 17 and 18. As a result of the reduction of the delivery of fuel to the firing system 22, less flue gas r is produced, so that correspondingly less steam is generated for the high-pressure part 10a of the steam turbine 10. In addition, a reduction in the steam quantity in the water/steam circuit or loop 15 lowers both the temperature and the pressure in the medium-pressure part 10b of the steam turbine 10. In order to prevent evaporation from the heating surfaces of the economizer, it was necessary in the prior art to reduce either the quantity or temperature of the exhaust gas of the gas turbine, and optionally to cool down the intermediate superheater with the aid of external cooling. However, that disadvantageously resulted in a reduction in the total efficiency of the system.

By comparison, as a result of the medium-pressure heater 31 additionally provided in accordance with the invention locally upstream of the economizer 36, as viewed in the flow direction of the flue gases r and exhaust gases a, a heat sink is created. As a result, additional heat is withdrawn from the flue gas r and from the optionally additionally introduced exhaust gas a, so that evaporation of the heating surfaces of the economizer 36 is reliably prevented. Moreover, as a result of the additionally produced steam in the medium-pressure heater 31, the quantity of steam flowing through the medium-pressure part 10b of the steam turbine assembly 10 is increased, so that the superheater 32 can be acted upon with a large exhaust gas quantity from the gas turbine 2 through the partial stream line 17 in the partial-load range as well and therefore can be operated without cooling. In the process, the mix temperature T4 in the superheater 32 is kept constant through an open or closed-loop control of the quantities of the partial streams b and c and of the quantity of steam from the medium-pressure heater 31.

FIG. 2 shows a variant of the medium-pressure heater 31 in the steam generator 14 of FIG. 1. The superheater stage 61 is connected directly downstream of the preheater stage 60 inside the steam generator 14. On the outlet side, the superheater stage 61 is connected to a water/steam separating vessel 74. The feedwater, which is preheated in the preheater stage 60 and then superheated in the superheater stage 61, flows into the water/steam separating vessel 74. There, the steam is separated from the water. As described above, the steam flows through a line 58a into the intermediate superheater 32. The water is carried through a line 44a into the feedwater tank 13.

We claim:

1. A combined gas and steam turbine system, comprising:

a steam turbine having a water/steam loop and a high-pressure stage in said water/steam loop, said water/steam loop defining water flow direction, said high-pressure stage having a preheater and a high-pressure heater connected downstream of said preheater as seen in the water flow direction;
   a gas turbine defining a gas flow direction; and
   a steam generator connected downstream of said gas turbine as seen in the gas flow direction, said steam generator including a firing system producing flue gases flowing in a given direction, said preheater, said high-pressure heater, an intermediate superheater connected downstream of said high-pressure stage as seen in the water flow direction, and a medium-pressure heater connected parallel to said high-pressure stage with respect to the water flow direction, said medium-pressure heater being disposed in said steam generator between said high-pressure heater and said preheater, as seen in the given flow direction of the flue gases.

2. The combined gas and steam turbine system according to claim 1, wherein said steam turbine has a high-pressure part, said high-pressure part, said preheater and said high-pressure heater are connected in a series circuit as seen in the gas flow direction, and said medium-pressure heater is connected parallel to the series circuit with respect to the water flow direction.

3. The combined gas and steam turbine system according to claim 2, including an inflow line for feedwater for said medium-pressure heater, and a pump disposed in said inflow line.

4. The combined gas and steam turbine system according to claim 1, including means for directing at least a portion of exhaust gases from said gas turbine directly into said steam generator by bypassing said firing system.

5. The combined gas and steam turbine system according to claim 1, including means for directing a partial stream of exhaust gases from said gas turbine into said steam generator downstream of said intermediate superheater, as seen in the given flow direction of the flue gases.

6. The combined gas and steam turbine system according to claim 1, including means for directing a partial stream of exhaust gases from said gas turbine into said steam generator upstream of said intermediate superheater, as seen in the given flow direction of the flue gases.

7. The combined gas and steam turbine system according to claim 1, wherein said intermediate superheater includes a preheater stage and a final superheater stage connected downstream of said preheater stage as seen in the water flow direction, and including means for directing a partial stream of exhaust gases from said gas turbine into said steam generator between said preheater stage and said final superheater stage.

8. The combined gas and steam turbine system according to claim 1, wherein said preheater includes a parallel circuit having a first heat exchanger disposed inside said steam generator and a second heat exchanger disposed outside said steam generator, and an economizer disposed inside said steam generator and connected downstream of said parallel circuit as seen in the water flow direction.

9. The combined gas and steam turbine system according to claim 8, wherein said medium-pressure heater is connected downstream of said parallel circuit as seen in the water flow direction including said first heat exchanger and said second heat exchanger.

10. The combined gas and steam turbine system according to claim 1, wherein said medium-pressure heater includes a preheater stage and a superheater stage connected downstream of said preheater stage as seen in the water flow direction.

11. The combined gas and steam turbine system according to claim 1, wherein said high-pressure heater includes a preheater stage and a superheater stage connected downstream of said preheater stage as seen in the water flow direction.

12. The combined gas and steam turbine system according to claim 7, wherein said medium-pressure heater and said preheater stage of said intermediate superheater each have an outlet side, and said final superheater stage of said intermediate superheater has an inlet side, and wherein said outlet side of said medium-pressure heater is connected to said outlet side of said preheater stage of said intermediate superheater and to said inlet side of said final superheater stage of said intermediate superheater.

* * * * *